United States Patent [19]
Glasenapp et al.

[11] 3,977,727
[45] Aug. 31, 1976

[54] RIM WITH BEAD UNSEAT RESTRAINT

[75] Inventors: William A. Glasenapp, Medina; Michael G. Miller, Cuyahoga Falls, both of Ohio

[73] Assignee: The B. F. Goodrich Company, Akron, Ohio

[22] Filed: June 9, 1975

[21] Appl. No.: 585,324

[52] U.S. Cl. .................................................. 301/97
[51] Int. Cl.² ........................................... B60B 21/10
[58] Field of Search ............................. 301/95–98, 301/63 R, 65, 5 R; 152/375, 378–381, 384–387

[56] References Cited
UNITED STATES PATENTS

| | | | |
|---|---|---|---|
| 663,899 | 12/1900 | Holmes | 152/375 |
| 1,396,515 | 11/1921 | McLevey | 152/384 |
| 2,551,783 | 5/1951 | Ash | 301/97 |

FOREIGN PATENTS OR APPLICATIONS

| | | | |
|---|---|---|---|
| 19,626 | 10/1893 | United Kingdom | 152/384 |

*Primary Examiner*—Allen N. Knowles
*Assistant Examiner*—Hadd Lane
*Attorney, Agent, or Firm*—Harry F. Pepper, Jr.; W. A. Shira, Jr.

[57] ABSTRACT

A wheel rim portion is designed to strengthen tire-rim seating relationship by the provision of radial projections raised from each annular seat portion of the rim. Such rims are particularly useful in extending the emergency use periods of run-flat tires. The radial projections are preferably in the form of barbs, raised from the rim seat by a chiseling action, or knurls, raised from the seat by a suitable knurling tool.

9 Claims, 3 Drawing Figures

RIM WITH BEAD UNSEAT RESTRAINT

BACKGROUND

The invention relates to pneumatic tire rims and particularly to rims designed to assist in strengthening the seating relationship between tires and rims.

Recent concern with vehicle safety has prompted manufacturers of various vehicle associated parts and equipment to alter their products. In order that such products contribute to the overall safety of vehicles, many manufacturers have developed new parts and equipment and/or modified their existing products.

Vehicle pneumatic tires have undergone many recent developments, some of which are related to the overall safety of the vehicle upon which they are utilized. One such development has been the "run-flat" pneumatic tire.

Run-flat pneumatic tires are specially designed tires which, under normal circumstances, function as most other tires, but which, upon sudden or gradual loss of air can continue to adequately function for an extended reasonable period of emergency use without air while in a flattened or partially uninflated condition. Categories of type of run-flat tires vary from structurally simple designs to quite elaborate structural combinations. Exemplary of the more structurally simpler run-flat tire constructions is a type of run-flat tire disclosed in U.S. Pat. No. 3,739,829, while a more elaborate run-flat tire would be exemplified in U.S. Pat. No. 2,040,645.

The structurally simpler run-flat tires basically employ designs allowing the tire to operate while totally uninflated to the extent that the tire sidewalls are bulged axially outwardly. Most of these types of run-flat tires typically terminate their emergency use period (i.e. the period during which they are used without air) by having one or both of their bead portions move axially inwardly along the tire rim, displacing the tire from its proper "seat" upon the rim. Thus, how long some of these tires will operate in an uninflated state largely depends upon how long the bead portions remain seated properly on the tire rim while used during this severe emergency period.

There have been modifications made to rims for the purpose of maintaining the bead portions of tires in their properly seated positions. Exemplary of such rim modifications are shown in U.S. Pat. Nos. 2,427,216; 2,663,061; 3,664,405 and 3,669,174. Most of these modifications have proven unacceptable for use with run-flat tires because they give rise to other problems. In many cases, known rim modifications make mounting and dismounting a difficult and/or more time consuming and laborious task. Also, some of these rim modifications have a destructive effect upon the bead portions seated upon the rim. Further, some rim designs modified to provide positive restraint against bead unseating, are so modified at the expense of rim strength or other important rim properties.

SUMMARY

This invention provides a pneumatic tire rim structure designed to strengthen the seating relationship between the bead portions of the tire and the rim seating surface thereby providing for longer periods of emergency use when the tire is used in an uninflated condition. The rim structure design is such as to not adversely effect the tire bead portions and/or important rim properties such as strength. Also, rim structure designs according to the present invention do not create new problems in intentional tire mounting and dismounting. Specifically, the rim structure is provided with a series of radial projections raised from a portion of each rim seat surface of the rim which projections are of such size and contour as not to interfere with intentional tire mounting or dismounting, but which nevertheless assist in holding each bead against axially inward movement from its respective seat when the tire is run in an uninflated condition. Properties of the rim, such as its strength, are basically unaffected by these radial projections because the projections are actually raised from the surface of the rim seat itself. Preferably, the projections are either a series of barbs or knurls, circumferentially spaced along a centralized zone of the annular bead seat surface of the rim. The barbed form of projections are preferably formed by a chiseling action directed away from the center of the rim causing the points of the barbs to orient themselves obliquely in an axial outward direction. The knurls can be forced by a suitable tool for such purpose.

THE DRAWINGS

In the accompanying drawings, the present invention is shown in accordance with its presently preferred embodiments and wherein.

DESCRIPTION OF PRESENTLY PREFERRED EMBODIMENTS

Figure 1:
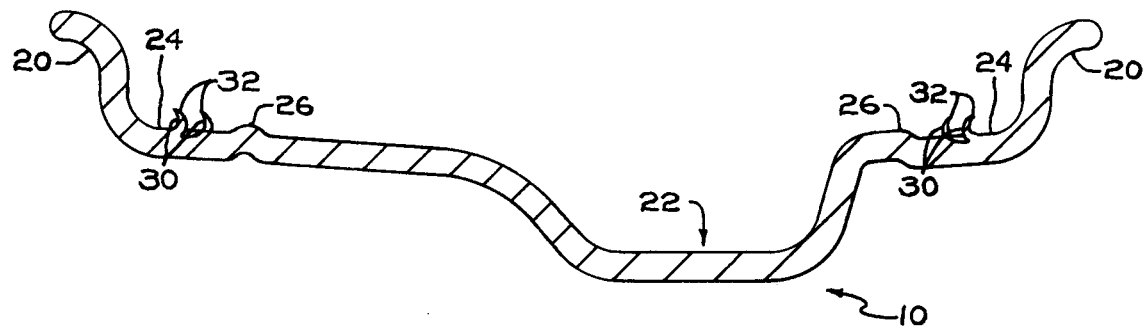
FIG. 1 shows a portion of a pneumatic tire wheel rim in section viewed longitudinally of the wheel axis.
Figure 2:
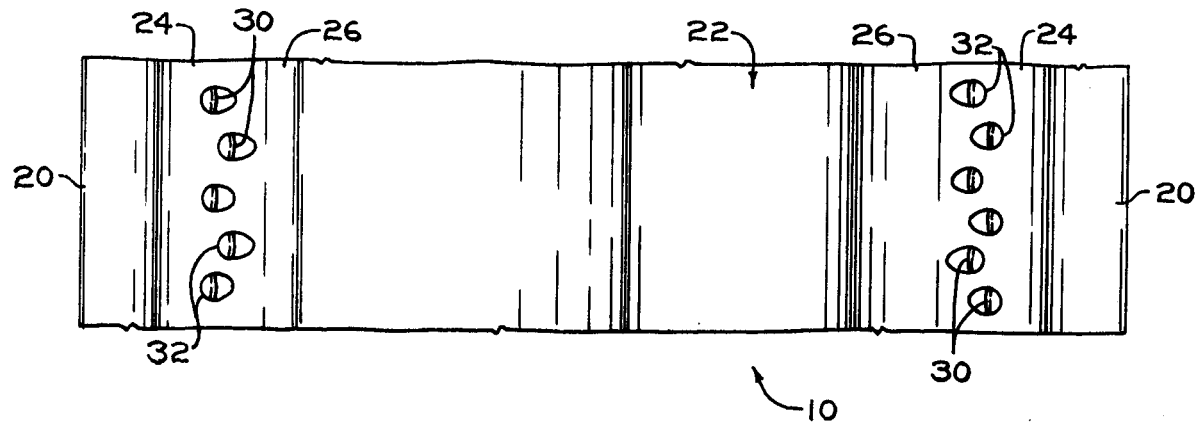
FIG. 2 shows a partial plan view of the rim illustrated of FIG. 1.

In FIGS. 1 and 2, a rim portion 10 of a wheel structure is shown which is adapted to mount a pneumatic tire. The rim portion comprises a typical pair of axially spaced tire bead engaging flanges 20 extending annularly around the wheel. The rim further comprises an annular off-center wheel "well" portion spaced axially inwardly from and located between rim flanges 20. An annular bead seat portion 24 is disposed adjacent each flange 20, axially between each flange 20 and well portion 22.

The axial width of each annular seat can vary depending upon the tire to be mounted upon rim 10 and typically is at least as wide as the radially inner surface or "base" of the tire bead. The axial inward extent of each seat portion 24 is often definable by the presence of a slight radial projecting mound or "safety hump", such as 26 formed on rim 10.

In accordance with the present invention, each radially outer surface of each rim seat 24 is provided with a plurality of radially projecting barbs 30 raised therefrom. The barbs are formed to extend obliquely relative to the radially outer, substantially planar surfaces of rim seats 24 so that the radially outer sharp edges 32 of the barbs point more in an axially outward direction toward each flange 20 rather than axially inwardly toward the wheel well 22. This particular contour of barbs 30 is to ease tire mounting problems by offering lesser interference for tire bead portions to move axially outwardly toward flanges 20, as in tire mounting, than interference to movement in the axially inward direction toward well 22.

The barbs 30 are sufficiently sharp so that they penetrate slightly the elastomeric outer surface normally covering the base of a typical tire bead portion. The barbs, however, do not project from the surface of seat 24 to such an extent that structural damage to the bead construction can easily occur.

For structural symmetry, the barbs are preferably disposed at equal circumferential spacings around annular bead seat 24 as shown more clearly in FIG. 2. Also, as shown in FIG. 2, the barbs may be disposed in axially spaced rows (two of such rows represented in FIGS. 1 and 2) with the annular location of barbs 30 in one row being circumferentially offset or staggered relative to the annular positions of barbs 30 in an adjacent row.

The barbs 30 can be raised from the radially outer surface of bead seat 24 by the action of a chisel type tool. To achieve the particular barb contour and orientation shown, the direction of force of the chiseling action is typically toward the flanges 20 rather than away therefrom.

The circumferential spacings between barbs in a given annular row of barbs can vary, as desired. A spacing of between about 1/16 inch to ½ inch has been found generally satisfactory for typical passenger tire size rims. Of course, other narrower or wider barb spacings are possible and are considered within the scope of the invention.

Figure 3:
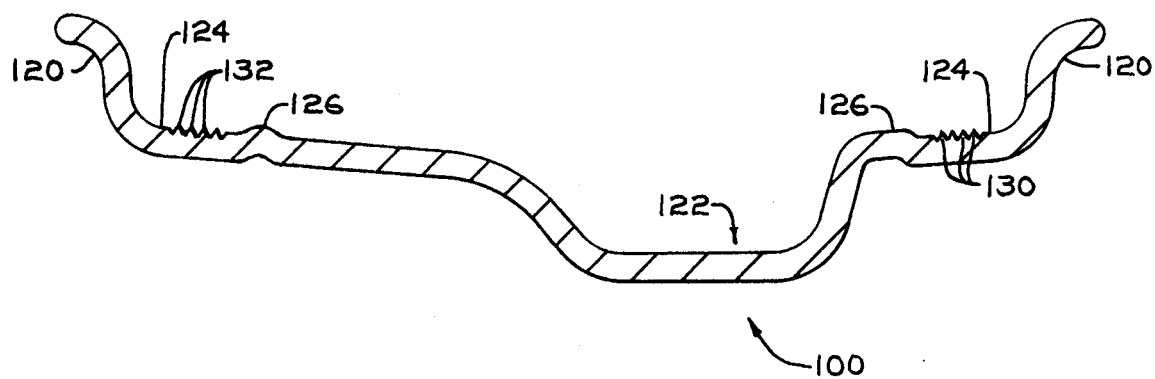
FIG. 3 shows a view similar to FIG. 1 showing an alternative rim design in accordance with this invention.

In FIG. 3, an alternative embodiment of the present invention is shown in which a rim 100 includes flanges 120, well 122, seats 124 and safety hump 126 similar to that shown in FIGS. 1 and 2. In the case of FIG. 3, however, there are a plurality of radial projecting knurls 130 along the central zone of the radially outer surface of each bead seat 124. For ease of fabrication, it is preferred that each knurl annularly extend substantially continuously around each bead seat 124. Because the radial height of knurls 130 are substantially less than barbs 30 in the embodiment of FIGS. 1 and 2, such continuous extension should not cause insufficient contact between the bases of the bead portions and the whole of the bead seats 124.

As shown the knurls 130 have edges 132 which are only very slightly above the plane of the outer surface of bead seats 124 so that intentional mounting and dismounting of tires is not substantially interfered with.

In order to demonstrate the effectiveness of rim structures according to the present invention. Three run-flat tire constructions of one tire each were made. Each tire, hereinafter designated A, B, and C in accordance with their differing constructions, were of similar dimensions such that each would properly mount on the same rim. Each of tires A, B, and C were sequentially mounted and operated in an uninflated condition on a typical "first" 15 in. (38cm) rim on the right front position of an automobile until they were considered no longer functional or "failures". Table I shows the emergency use distance for these tires and their respective types of failure.

TABLE I

| Tire | Miles (Kilometers) to Failure | Type of Failure |
| --- | --- | --- |
| A | 4.1 (6.6) | bead unseat |
| B | 1.5 (2.4) | bead unseat |
| C | 4.7 (7.6) | bead unseat |

The tires A, B, and C were removed from the first rim and mounted on a "second" rim identical to the first except that a series of barbs had been chiseled along each annular bead seat surface of this second rim at substantially ¼ in. (6.35mm) circumferential spacings.

Each of these tires were again tested in turn under essentially the same conditions as the tests on the first rim. Table II shows the emergency use distances and types of failures for this second rim test.

TABLE II

| Tire | Miles (Kilometers) to Failure | Type of Failure |
| --- | --- | --- |
| A | 51.8 (83.8) | bead unseat |
| B | 11.8 (19.1) | bead unseat |
| C | 15.6 (25.2) | other |

As seen, a significant increase in emergency use distance was realized as to tire A. Tire B showed an increase in run-flat time, although not as significant as in the case of tire A. The results on tire C were not considered conclusive because the tire did not "fail" due to bead unseat, but due to another phenomenon unrelated to bead unseating. In the case of tire C, however, it can be said that no failure occurred due to bead unseating before 15.6 miles (25.2km) when failure for another reason occurred.

A "third" rim was supplied which was identical to the second rim except that the barbs provided were made larger than the barbs provided on the second rim. Tire B was mounted on this third rim and operated while uninflated under conditions essentially similar to the first and second rim tests. Table III shows the results of this last test.

TABLE III

| Tire | Miles (Kilometers) to Failure | Type of Failure |
| --- | --- | --- |
| B | 55.2 (89.4) | bead unseat |

This last test on tire B demonstrates that the barbs may vary in size according to the specific tire to be used for optimum results.

The foregoing describes the present invention in accordance with presently preferred embodiments, and the details disclosed are subject to obvious modification and change without departure from the scope of the invention which is measured by the following claims.

What is claimed is:

1. In a wheel member having an annular metal rim portion with a pair of axially spaced, annular flanges, an annular well portion intermediate said flanges and an annular imperforate, bead seat portion adjacent each flange and axially spaced from said well portion, each bead seat portion having a radially outer, annular surface for seating the base of each bead portion of a pneumatic tire, the improvement comprising a plurality of radial metallic projections integral with and raised only from portions of each seating surface to penetrate a portion of the base of each bead portion of a pneumatic tire.

2. The improvement as defined in claim 1 wherein the plurality of radial projections are circumferentially spaced around each seating surface.

3. The improvement as defined in claim 1 wherein the radial projections are knurls.

4. The improvement as defined in claim 2 wherein the radial projections are knurls.

5. The improvement defined in claim 1 wherein the radial projections are barbs.

6. The improvement defined in claim 5 wherein said barbs are circumferentially spaced around each seating surface.

7. The improvement defined in claim 5 wherein the barbs have sharp portions extending axially outwardly.

8. The improvement defined in claim 5 wherein the barbs are arranged in adjacent annular rows with barbs in a given row circumferentially offset relative to barbs in a row adjacent the given row.

9. The improvements defined in claim 8 wherein the barbs have sharp portions extending axially outwardly.

* * * * *